United States Patent [19]

Feldbaumer

[11] Patent Number: 5,382,841
[45] Date of Patent: Jan. 17, 1995

[54] SWITCHABLE ACTIVE BUS TERMINATION CIRCUIT

[75] Inventor: David W. Feldbaumer, Chandler, Ariz.

[73] Assignee: Motorola, Inc., Schaumburg, Ill.

[21] Appl. No.: 812,146

[22] Filed: Dec. 23, 1991

[51] Int. Cl.$^6$ .................. H03K 17/16; H03K 5/00
[52] U.S. Cl. .................. 326/30; 327/540; 327/546
[58] Field of Search ............ 333/34 R; 307/443, 147, 307/296.4, 296.1, 475; 340/825.5; 371/40.1

[56] References Cited

U.S. PATENT DOCUMENTS

| | | | |
|---|---|---|---|
| 4,220,876 | 9/1980 | Ray | 307/363 |
| 4,675,551 | 6/1987 | Stevenson et al. | 307/443 |
| 4,748,426 | 5/1988 | Stewart | 307/443 |
| 4,859,877 | 8/1989 | Cooperman et al. | 307/443 |
| 5,029,284 | 7/1991 | Feldbaumer et al. | 307/443 |

OTHER PUBLICATIONS

"Unitrode SCSI Active Terminator", Data Manual pp. 2–4 UC5601, Sep. 1991.

Primary Examiner—Edward P. Westin
Assistant Examiner—Richard Roseen
Attorney, Agent, or Firm—Robert D. Atkins

[57] ABSTRACT

A bus termination circuit actively switches a terminating resistor from the bus conductor in response to a control signal. A first state of the control signal connects the bus conductor through the terminating resistor to a voltage reference source, while a second state of the control signal isolates the bus conductor from the voltage reference source. Thus, the switchable active bus termination circuit can be permanently installed in computer peripheral devices and activated by the control signal.

3 Claims, 2 Drawing Sheets

SWITCHABLE ACTIVE BUS TERMINATION CIRCUIT

BACKGROUND OF THE INVENTION

The present invention relates in general to bus termination circuits and, more particularly, to a switchable active bus termination circuit operating serially with the electrical bus.

Most computer systems, for example in office environments, communicate with peripheral devices over an electrical conduction bus or multi-conductor cable. Computers and computer peripheral devices, such as printers, modems and disk drives, are typically networked together allowing communication between the host computer and peripherals via the electrical bus. One example of an electrical bus is the small computer system interface (SCSI) bus approved by the American National Standards Institute (ANSI).

The electrical bus is susceptible to reflections of the logic signals along the transmission line unless properly terminated with an impedance equal to the characteristic impedance of the electrical bus. In prior art applications, the termination is typically a passive two-resistor divider network (220 ohms and 330 ohms) coupled between a positive power supply conductor (5 volts) and ground potential. In an AC analysis, the resistors operate in parallel and provide an effective impedance of 132 ohms to ground to closely match the characteristic impedance of the electrical bus. In a DC analysis, the resistor divider produces a reference potential, approximately 2.85 volts, at the interconnection of the resistors for establishing the output high voltage level ($V_{OH}$). The SCSI standard requires the peripheral devices to operate with open-collector outputs such that the electrical bus is normally high and active low.

One problem with the passive resistor termination is the inherent drift and inaccuracies of setting resistor values within an integrated circuit resistor array. Since the termination resistors set the $V_{OH}$ level and determine the sink current through the open-collector devices in the computer peripherals, the value of the resistors must be carefully selected. Resistor tolerance is also a problem for thin film processing because the sheet resistance varies with manufacturing process, and with temperature during operation.

Another problem is the constant DC power consumption between the positive power supply conductor through 550 (220+330) ohms of resistance to ground. Each electrical conduction bus terminator dissipates approximately 45 milliwatts.

Presently, most SCSI systems use a terminating resistor array in a single in-line package (SIP) which can be plugged into a socket of the terminating peripheral device. To connect the peripheral to the end of the network, a resistor SIP is plugged into a socket thereby designating the peripheral as the last device on the bus. If the peripheral device is not the last device on the bus, the resistor SIP must be removed. The manual operation of inserting and removing the resistor SIP in the peripheral device is inconvenient and often confusing especially for nontechnical users.

Therefore, a need exists for a switchable bus terminator circuit that can be permanently installed in computer peripheral devices and activated by a control signal.

SUMMARY OF THE INVENTION

Briefly stated, the invention comprises a bus termination circuit coupled to a bus conductor consisting essentially of a resistor and an active switching circuit serially coupled between the bus conductor and a reference voltage source. The active switching circuit operates in response to a control signal for completing the conduction path between the reference voltage source and the bus conductor.

In another aspect, the present invention is a method of actively switching the termination of a bus conductor consisting essentially of the steps of connecting the bus conductor through a resistor serially to a voltage reference source in response to a first state of a control signal, and isolating the bus conductor from the voltage reference source in response to a second state of the control signal.

DETAILED DESCRIPTION OF THE PREFERRED EMBODIMENT

Figure 1:
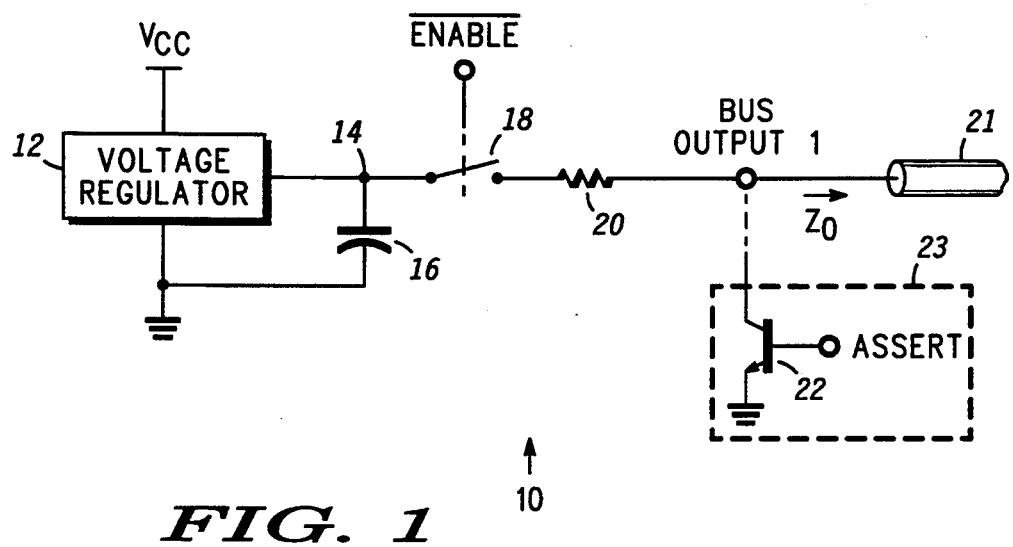
FIG. 1 is a schematic diagram illustrating an active serial bus termination circuit.

Referring to FIG. 1, a bus termination circuit 10 is shown suitable for manufacturing as an integrated circuit using conventional integrated circuit processes. Voltage regulator 12 receives a positive power supply potential $V_{CC}$ (typically 5.0 volts) and provides a constant reference potential, say 2.85 volts, at node 14. Filter capacitor 16 is coupled between node 14 and ground potential for stabilizing the regulated DC voltage reference. Capacitor 16 is typically large and must therefore be connected externally to the integrated circuit containing the integrated components. Switching circuit 18 and resistor 20 are serially coupled between node 14 and bus output 1 for providing termination thereof equal to the characteristic impedance $Z_0$ of electrical conductor 21, 110 ohms. Resistor 20 may actually be realized as two larger value resistors, say 220 ohms, connected in parallel for improved temperature stability. Switching circuit 18 is responsive to an $\overline{\text{ENABLE}}$ control signal for opening and closing the conduction path between voltage regulator 12 and bus output 1. The $\overline{\text{ENABLE}}$ control signal may be activated by an external switch or control circuit (not shown) on the computer peripheral device.

When asserted, the $\overline{\text{ENABLE}}$ control signal closes switching circuit 18 and applies the 2.85 volt reference signal through resistor 20 to bus output 1. In an AC analysis, bus output 1 views resistor 20 as 110 ohms to ground and thus terminates the bus with a near matched impedance to eliminate reflections along the transmission line. In a DC mode, the 2.85 volt reference signal maintains the $V_{OH}$ level on bus output 1. Bus output 1 is pulled low when an open-collector device, like transistor 22 in computer peripheral 23, is activated by an ASSERT signal. Resistor 20 sets the current sunk by transistor 22.

FIG. 1 illustrates only one conductor, namely bus output 1, of the complete electrical conduction bus which may include eighteen or more individual conductors each requiring terminating as shown for bus output 1. Accordingly, switching circuit 18 and resistor 20 must be repeated for each conductor of the electrical bus.

Figure 2:
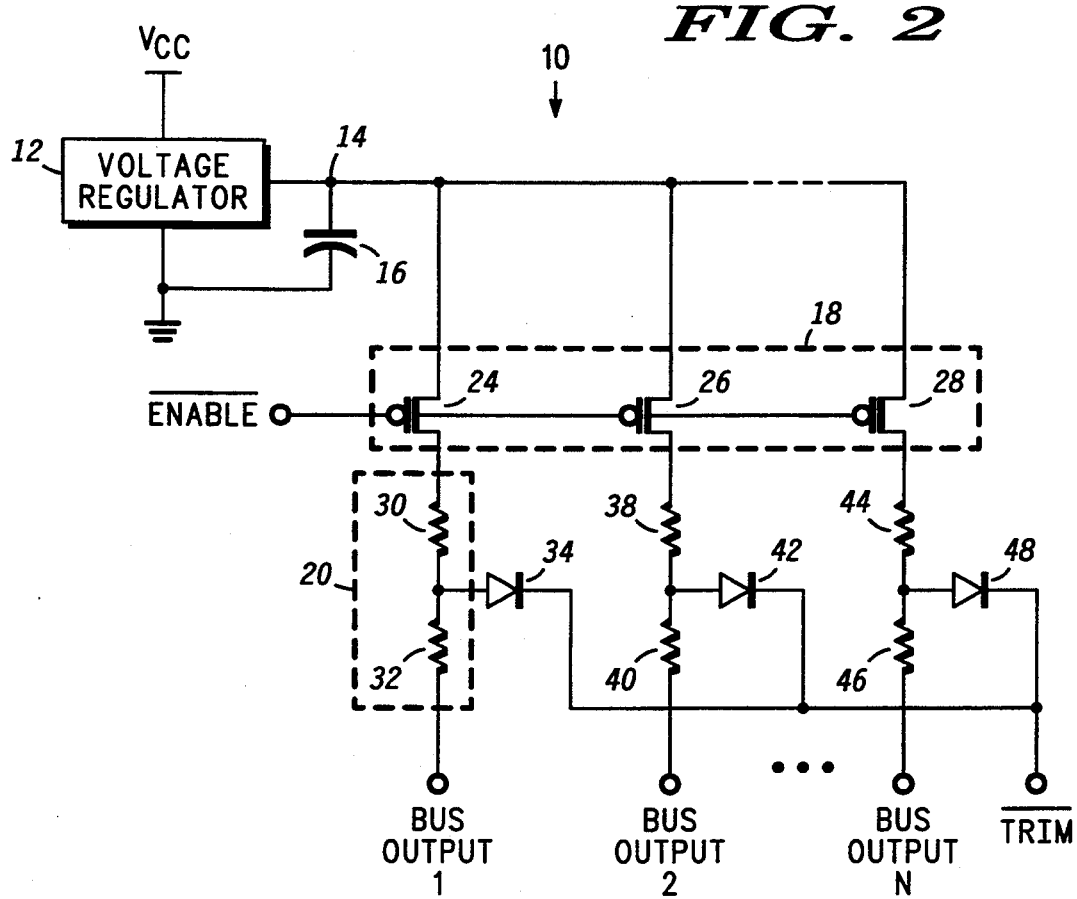
FIG. 2 is a schematic diagram illustrating further detail of the active serial bus termination circuit.

Turning to FIG. 2, further detail of bus termination circuit 10 is shown including transistors 24, 26 and 28 for performing the switching function of switching circuit 18. The sources of P-channel transistors 24, 26 and 28 are coupled to node 14 while the gates receive the $\overline{\text{ENABLE}}$ control signal. Voltage regulator 12 and capacitor 16 operate as described in FIG. 1. Resistor 20 is shown as a fixed resistor 30 and a polysilicon thin film trimmable resistor 32 serially coupled between the drain of transistor 24 and bus output 1. Diode 34 includes an anode coupled to the interconnection of resistors 30-32 and a cathode receiving a $\overline{\text{TRIM}}$ control signal.

Similarly, fixed resistor 38 and a polysilicon thin film trimmable resistor 40 are serially coupled between the drain of transistor 26 and bus output 2. Diode 42 includes an anode coupled to the interconnection of resistors 38-40 while its cathode receives the $\overline{\text{TRIM}}$ control signal. Fixed resistor 44 and a polysilicon thin film trimmable resistor 46 are serially coupled between the drain of transistor 28 and bus output N. Diode 48 includes an anode coupled to the interconnection of resistors 44-46 and the cathode receives the $\overline{\text{TRIM}}$ control signal.

Polysilicon thin film trimmable resistors 32, 40 and 46 are highly doped and exhibit a positive temperature coefficient. It is commonly known that the temperature coefficient of polysilicon is dopant dependent and can be positive, negative or zero to optimize temperature performance of the integrated terminator. Polysilicon resistors 30, 38 and 44 are doped to provide a negative temperature coefficient to offset the thermal variation of polysilicon thin film trimmable resistors 32, 40 and 46. Thus, the temperature coefficient of resistors 32, 40 and 46 are equal and opposite to the temperature coefficient of resistors 30, 38 and 44.

In another embodiment, resistors 30-32, 38-40 and 44-46 may be located on the source side of transistors 24-28, respectively. Another option is to use N-channel or bipolar transistors for switching circuit 18.

The trimming operation of resistors 32, 40 and 46 is thoroughly described in U.S. Pat. No. 5,029,284 and is hereby incorporated by reference. Briefly, resistor 32 is trimmed by applying a high signal to bus output 1 and a series of low pulses with the $\overline{\text{TRIM}}$ control signal such that diode 34 conducts high current pulses and anneals the resistor body in a controlled manner to produce a more conductive polycrystalline structure. Accordingly, the resistance of resistor 34 decreases with resolution in tenths of ohms. A typical value for series resistors 30-32 after trim is 100 ohms which, in combination with the series resistance of transistor 24, provides the desired 110 ohm termination impedance as per SCSI specification. Resistors 40 and 46 are trimmed in a similar manner.

A low $\overline{\text{ENABLE}}$ control signal turns on transistors 24-28 and provides 110 ohm termination impedance for bus outputs 1-N. Alternately, to remove the bus termination, a high $\overline{\text{ENABLE}}$ control signal turns off transistors 24-28 and isolates the 2.85 volt reference signal at node 14 from bus outputs 1-N. Thus, the $\overline{\text{ENABLE}}$ control signal activates and deactivates the termination of bus outputs 1-N. The termination resistors may be permanently installed in the peripheral device and operated with the $\overline{\text{ENABLE}}$ control signal.

Figure 3:
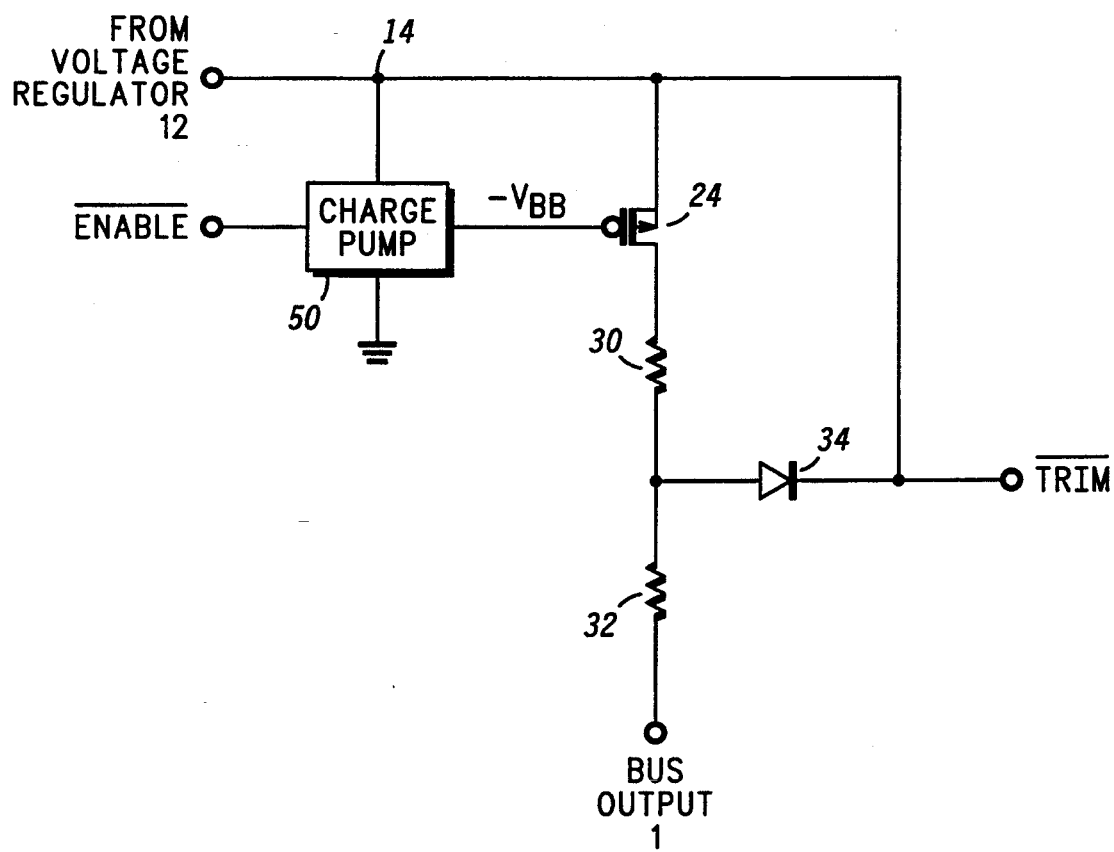
FIG. 3 is a schematic diagram illustrating a charge pump in operation with the active bus termination circuit.

A charge pump 50 is included in FIG. 3 for providing a more negative control signal $-V_{BB}$, say $-3.5$ volts, to the gate of transistor 24. The gate-source voltage ($|V_{GS}|$) increases to $2.85-(-3.5)=6.35$ volts which allows a smaller geometry for transistor 24 with the associated decrease in series resistance and drain capacitance. Similar charge pumps like 50 may be included for transistors 26 and 28.

Hence, what has been provided is a novel switchable active bus termination circuit useful in reducing signal reflections and permanently installable in computer peripheral devices for activation by a control signal. While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A switchable active bus termination circuit coupled to a bus conductor, consisting essentially of:
   a first transistor having a control electrode and first and second conduction electrodes, said control electrode being coupled for receiving a first control signal, said first conduction electrode receiving a reference voltage;
   first and second resistors serially coupled between said second conduction electrode of said first transistor and the bus conductor;
   unilateral conduction means coupled to the interconnection of said first and second resistors and operating in response to a second control signal for passing high current pulses to trim the value of said second resistor; and
   a voltage regulator having an output for providing said reference voltage.

2. The bus termination circuit of claim 1 further consisting of a charge pump circuit having a control input and an output, said control input receiving said first control signal, said output providing a voltage of predetermined magnitude to said control electrode of said first transistor.

3. The bus termination circuit of claim 2 wherein said first resistor has a temperature coefficient of resistance equal and opposite to the temperature coefficient of said second resistor.

* * * * *